United States Patent [19]

Saiki et al.

[11] 3,857,881

[45] Dec. 31, 1974

[54] PROCESS FOR THE SEPARATION AND RECOVERY OF METHYLTEREPHTHALIC ACID AND 4-METHYLISOPHTHALIC ACID FROM A MIXTURE THEREOF

[75] Inventors: Noritsugu Saiki; Takeshi Fujii; Gentaro Yamashita, all of Iwakuni, Japan

[73] Assignee: Teijin Limited, Osaka, Japan

[22] Filed: Aug. 3, 1971

[21] Appl. No.: 168,576

[30] Foreign Application Priority Data
Dec. 25, 1970 Japan.............................. 45-117536
Dec. 25, 1970 Japan.............................. 45-117556
Dec. 28, 1970 Japan.............................. 45-123955

[52] U.S. Cl. ................................................. 260/525
[51] Int. Cl. ............................................. C07c 51/48
[58] Field of Search ..................................... 260/525

[56] References Cited
UNITED STATES PATENTS
2,734,914 2/1956 McKinnis........................... 260/525
2,741,633 4/1956 McKinnis et al.................... 260/525
2,811,548 10/1957 Ham et al. ......................... 260/525
2,829,160 4/1958 Stehman et al. .................... 260/525
2,862,963 12/1958 Fuchs et al. ....................... 260/525
3,261,842 7/1966 Schenk et al. ..................... 260/525

Primary Examiner—Lorraine A. Weinberger
Assistant Examiner—Paul J. Killos
Attorney, Agent, or Firm—Sherman & Shalloway

[57] ABSTRACT

Methylterephthalic acid (MTA) and 4-methylisophthalic acid (MIA) are difficult to separate because of their similar solubilities in various organic solvents. According to the invention, a salt of a mixture of MTA and MIA with ammonia, specific diamines such as hexamethylene diamine or bis(p-aminocyclohexyl) methane, or piperazine is contacted with an aqueous solvent such as alcohol, monomethyl or monoethyl ether of ethylene glycol or dioxane, whereby a salt of MTA is easily separated as a precipitate from a salt of MIA. These salts are utilized as nylon salts, or can be converted, if desired, to MTA or MIA by treatment with acid.

15 Claims, 3 Drawing Figures

PROCESS FOR THE SEPARATION AND RECOVERY OF METHYLTEREPHTHALIC ACID AND 4-METHYLISOPHTHALIC ACID FROM A MIXTURE THEREOF

This invention relates to a process for separating methylterephthalic acid (MTA) and 4-methylisophthalic acid (MIA) from a mixture thereof, each being separated at higher concentrations. More particularly, the invention relates to a process wherein a mixture of MTA and MIA is brought into contact with a mixed solvent of a hydrophilic organic solvent and water in the form of their salts with a specific base, following which the MTA salt and MIA salt are separately recovered at concentrations higher than that indicated by their respective ratios in the starting MTA-MIA mixture, utilizing the difference in solubilities of the MTA salt and the MIA salt in the mixed solvent and, if desired, either one or both of the MTA salt and the MIA salt are further precipitated with the addition of an acid, after which the precipitate is separated and recovered, thereby recovering the MTA and/or MIA at concentrations higher than that indicated by their respective ratios in the starting mixture.

MTA, which is a white, solid compound at normal temperature, has the formula and MIA, also a white, solid compound at normal temperature, has the formula MTA and MIA being rather difficult to prepare singly are usually obtained as a mixture.

For instance, the MTA-MIA mixtures can be obtained by the oxidation of pseudocumene with, for example, nitric acid or molecular oxygen, e.g., air under suitable conditions. General disclosure of such processes can be found, for example, in U.S. Patents 3,227,752, 3,008,983 and 3,334,135.

According to studies which have been made, it was found that MTA-MIA mixtures could be produced in good yield and at high selectivity when pseudocumene was oxidized with molecular oxygen (1) in 3 - 25 weight parts per one weight part of the pseudocumene of acetic acid as the solvent, (2) under at least 0.2 atmosphere of partial pressure of oxygen and (3) reaction temperature ranging from 100° to 220° C., (4) in the presence of a catalytic composition composed of a cobalt compound, or a cobalt compound and a manganese compound, plus a bromine compound, which are soluble in the acetic acid solvent under the reaction conditions, in an amount satisfying the following general relationships (I) and (II):

$$-1.9 - 0.016 \times T \leq \log(A \cdot B) \leq -1.30 - 0.115 \times T \quad (I)$$

$$1.60 - 0.011 \times T \leq \log(B/A) \leq 1.80 + 0.0115 \times T \quad (II)$$

in which

A is the weight of the cobalt metal in the cobalt compound employed, or the cobalt metal plus the manganese metal, in the cobalt compound plus the manganese compound employed, divided by the weight of the charged pseudocumene and that of acetic acid;

B is the gram-atom number of bromine in the bromine compound employed, divided by the gram-atom number of the cobalt metal in the cobalt compound employed, or the cobalt and manganese metals in the cobalt and manganese compounds employed; and T is the reaction temperature selected from the range of 100° - 220°C.

Furthermore, it has been confirmed by studies made that the MTA-MIA mixtures could be selectively produced from pseudocumene in good yield by such procedures as follows:

A. Oxidation of pseudocumene with molecular oxygen (1) using a compound of a heavy metal such as cobalt or manganese in an amount of 0.02 - 2 parts by weight, calculated as the metal, per 100 parts by weight of pseudocumene, and a bromine compound in an amount corresponding to 0.1 - 2 atoms as bromine atom, per atom of the metal of the heavy metal compound, as catalyst, (2) in the substantial absence of a solvent, (3) at temperatures ranging from 100° - 250°C., (4) and at partial pressure of oxygen of at least 0.2 atmosphere;

or

B. Oxidation of pseudocumene with molecular oxygen, using a compound of a heavy metal such as cobalt or manganese, and a bromine compound as catalyst, in such solvents as benzene, mono- and dichlorobenzene, t-butylbenzene, etc., at temperatures ranging from 100° to 250°C.

As another mode of operating the process of air-oxidation of pseudocumene, the intended MTA-MIA mixtures can be formed by the catalytic reaction of a cobalt compound which is soluble in acetic acid, in the absence of a bromine compound in the catalyst system. In such a practice, favorable results can be obtained when at least 6 molar times the pseudocumene of acetic acid is used for the foregoing oxidation process at approximately 90° - 150°C., using at least 0.2 gram-atom, as cobalt metal, per gram-mol of pseudocumene of a cobalt compound, for example, cobalt acetate as the catalyst. Again, it is also possible in this process to decrease the amount of the cobalt catalyst and use an aldehyde as an accelerator.

MTA-MIA mixtures can be obtained at weight ratios of 50 - 70 % of the former to 30 - 50 % of the latter by operating in accordance with the methods of oxidizing pseudocumene hereinbefore described.

MTA-MIA mixtures can also be formed by various other methods besides those described above. For example, a xylene mixture can be chloromethylated and then oxidized with nitric acid and/or air to form such the desired mixture.

The MTA-MIA mixtures to be used as the starting material in the invention may be prepared by any of the known methods such as hereinbefore described, i.e., the invention has no restrictions whatsoever imposed as to the method of making the starting mixture.

Since both MTA and MIA are monomethyl-substituted benzenedicarboxylic acids, they are useful as starting materials for the preparation of plasticizing agents, alkyd resins, unsaturated polyesters, etc. They are commercially very valuable intermediate products, particularly because their solubility in the various alcohols, such as butanol, octanol, ethylene glycol, propylene glycol, glycerine, pentaerythritol, etc., is better than that of terephthalic or isophthalic acid, with the consequence that they react readily with these alcohols. Furthermore, the plasticizers, alkyd resins or unsaturated polyesters prepared therefrom exhibit excellent thermal stability and mechanical properties.

However, due to the difference between MTA and MIA in that in the case of the former the two carboxyl groups are connected at the p-position of the benzene ring while those in the case of the latter are connected at the m-position, MTA and MIA logically have different utilities. For instance, MTA can form substantially linear, highly crystalline, high melting fiber- or film-forming polyamides through such procedures as reaction with such diamines as hexamethylenediamine, dodecamethylenediamine, bis-(4-aminocyclohexyl) methane, etc., to form a diamine salt of MTA, followed by polycondensation thereof. On the other hand, MIA can also form substantially linear polyamides by means of a reaction with such diamines as above named, but the products show a lower melting point and crystallinity than those of the polyamides derived from MTA and for obvious reasons have different utilities from those of the latter. Similarly, the plasticizer, alkyd resin, unsaturated polyester, etc., derived from MTA have properties differing from those of the products derived from MIA.

In view of the foregoing, it is necessary to separate MTA and MIA in the mixture and to recover each at higher concentrations than that indicated by the ratios at which they are contained in the mixture.

Although both MTA and MIA are sublimative white solids, their recovery separately from the MTA-MIA mixtures each at higher concentrations cannot be achieved by either the sublimation or distillation process.

Again, the MTA-MIA mixtures are soluble in the various organic solvents, e.g., alcohols such as methanol, ethanol and propanol; glycols such as ethylene glycol and propylene glycol; ethers such as diethyl ether, dioxane, tetrahydrofuran and methyl cellosolve; organic carboxylic acids such as acetic acid and propionic acid; dimethylformamide, dimethylacetamide and dimethyl sulfoxide, but it is not an easy matter to separate MTA and MIA each at higher concentrations with high efficiency, using these organic solvents. This is because the difference in solubilities between MTA and MIA in the foregoing solvents is extremely small. Therefore, it is difficult to separate MTA from MIA in the MTA-MIA mixtures by either the recrystallization or extraction technique using these solvents.

We therefore attempted the separation of MTA and MIA by first converting the MTA and MIA in the mixture to their corresponding lower dialkyl esters such as methyl or ethyl ester and thereafter separating these esters by distillation, utilizing the difference in the boiling points of the esters. However, it was found that there was substantially no difference in the boiling points between the lower dialkyl esters of MTA and MIA. Thus it was confirmed that the effective separation of MTA and MIA could not be achieved through the esterification followed by distillation, a separation process normally applied to mixtures of dicarboxylic acid isomers. Furthermore, since these esters do not demonstrate an appreciable difference in solubility in such organic solvents as hereinbefore mentioned, the esters could not be smoothly separated by means of either the recrystallization or extraction technique.

A primary object of the invention is therefore to provide a process for separating MTA and MIA from the mixtures thereof in the form of their salts with specific bases, the separation being accomplished at higher concentrations. Another object is to provide a process for separating and recovering MTA and MIA from the mixtures thereof, each at a higher concentration, by a method wherein the above MTA salt and/or MIA salt, which has been separated and recovered at a higher concentration than that of the starting mixture, is treated with an acid, after which the resulting precipitate is separated and recovered. A further object is to provide a process for separating and recovering from mixtures of MTA and MIA at least MTA as a salt with a base or as a free acid in a high state of purity.

Other objects and advantages of the invention will become apparent from the following description.

According to the present invention, a mixture of salts of MTA and MIA and at least one base selected from the group consisting of a. ammonia,
b. aliphatic diamines of 2 – 12 carbon atoms,
c. diamines of the formula wherein $n$ is a positive integer from 1 to 3, and $\phi$ is either a p- or m-phenylene group, or p- or m-cyclohexylene group, d. bis-(p-aminocyclohexyl) methane (PACM), and
e. piperazine, is contacted with a mixed solvent of water and at least one hydrophilic organic solvent selected from the group consisting of 1. mono- and dihydric alcohols of 1 – 3 carbon atoms,
2. monomethyl and monoethyl ethers of ethylene glycol, and
3. dioxane, to separate from the foregoing mixed solvent phase in a solid state a salt of MTA and base or a mixture of salts of MTA and MIA containing salt of MTA and base at a higher concentration, and thereafter solid product is recovered to thereby separate and recover MTA from a mixture of MTA and MIA in the form of a salt and at a higher concentration, thus achieving the aforesaid primary object of the invention.

The invention will be more fully described hereinafter.

As previously noted, the starting MTA-MIA mixture to be subjected to the present process may be prepared by any of the known methods, as mentioned hereinbefore. The ratio of MTA to MIA in the mixture is again optional. However, the separation in accordance with the invention is achieved with high efficiency and advantage when the process is applied to those MTA-MIA mixtures containing at least 10 % by weight, and preferably at least 20 % by weight, of MTA.

The starting MTA-MIA mixtures may contain minor amounts of impurities without appreciable detrimental effects, such as the liquid medium used in the preparation of the mixtures, e.g., acetic acid; oxidation intermediate products such as dimethylbenzoic acid, dimethylbenzaldehyde, methylformylbenzoic acid, etc.; by-products of the mixture-forming reaction, such as trimellitic acid, nitrated products of MTA, MIA, etc.; and the oxidation catalyst. Obviously, the less the impurities, the better, but the greatest part of those intermediate products and by-products of oxidation migrate into the solution side when the mixture is subjected to the present separation process and therefore do not become serious obstacles to the intended recovery of the MTA salt or MIA salts.

A search has been conducted for a process for separating MTA and/or MIA from conventional MTA-MIA mixtures at higher concentrations and it has been discovered that once the mixture is converted to a mixture of salts with at least one base selected from the group consisting of a'. ammonia, b'. aliphatic, straight chain $\omega,\omega'$-diamines of even number of carbon atoms within the range of 2 – 12, c'. diamines of the formula $$H_2N-(CH_2)-_n\phi-(CH_2)-_nNH_2$$

in which $n$ is a positive integer from 1 to 3, and $\phi$ is a p-phenylene group or p-cyclo-hexylene group, d'. bis-(p-aminocyclohexyl)methane (PACM), and e'. piperazine, such a salt of MTA demonstrates a considerably different solubility in water from that of MIA. In accordance with this discovery, copending patent application Ser. No. 140,213 discloses the particulars of a process for separating and recovery MTA and MIA at higher concentrations from a mixture thereof in the form of the hereinabove described salts, utilizing this difference in solubilities in water of the respective salts of MTA and MIA with the hereinbefore described bases.

As a result of further research into the process for separating and concentrating the respective salts of MTA and MIA wherein utilization is made of the difference in solubilities in a liquid medium of the mixture of the aforesaid salts of MTA and MIA, it was found that when as the liquid medium a mixed solvent consisting of water and at least one hydrophilic organic solvent selected from the group consisting of 1. mono- and dihydric alcohols of 1 – 3 carbon atoms,
2. monomethyl ether of ethylene glycol (methyl cellosolve and monoethyl ether of ethylene glycol (ethyl cellosolve), and
3. dioxane, is used instead of the water disclosed in the copending application noted above, the following advantages are had.

i. The ratio of the solubility of the MIA salt to the solubility of the MTA salt becomes much greater and therefore the separation effect of the MTA salt, i.e., selectivity, becomes better.

ii. Since the solubility of the MTA salt becomes much smaller, the operation of separating the MTA salt becomes easier. Moreover, the recovery of the MTA salt becomes greater.

iii. A salt with a base, which does not demonstrate a clear difference in solubility when the medium is water, demonstrates a clear difference in this respect. Thus, the salts with a branched aliphatic diamine in which the number of carbon atoms is an odd number such, for example, as 3-methylhexamethylenediamine and the salts with a base such, for example, as m-xylylenediamine and m-cyclohexylenediamine, which could not be used when the medium was water, can be used.

iv. The separation and recovery of the MIA salt from the mother liquor resulting after the separation and recovery of the MTA salt is facilitated. In view of the foregoing reason, the present invention uses a mixed solvent composed of water and at least one hydrophilic organic solvent selected from the group consisting of the solvents mentioned in (1), (2) and (3), above. As this mixed solvent, one in which the content of water is at least 10 % by weight, and preferably 15 – 90 % by weight, is usually used with advantage. A mixed solvent containing a relatively large amount of the aforesaid hydrophilic organic solvent is to be preferred, and most favorably used is one whose water content ranges between 20 % and 60 % by weight. On the other hand, as the hydrophilic organic solvent, conveniently useable from among those mentioned in (1), (2) and (3), above, are especially ethanol and methyl cellosolve.

Figure 1:
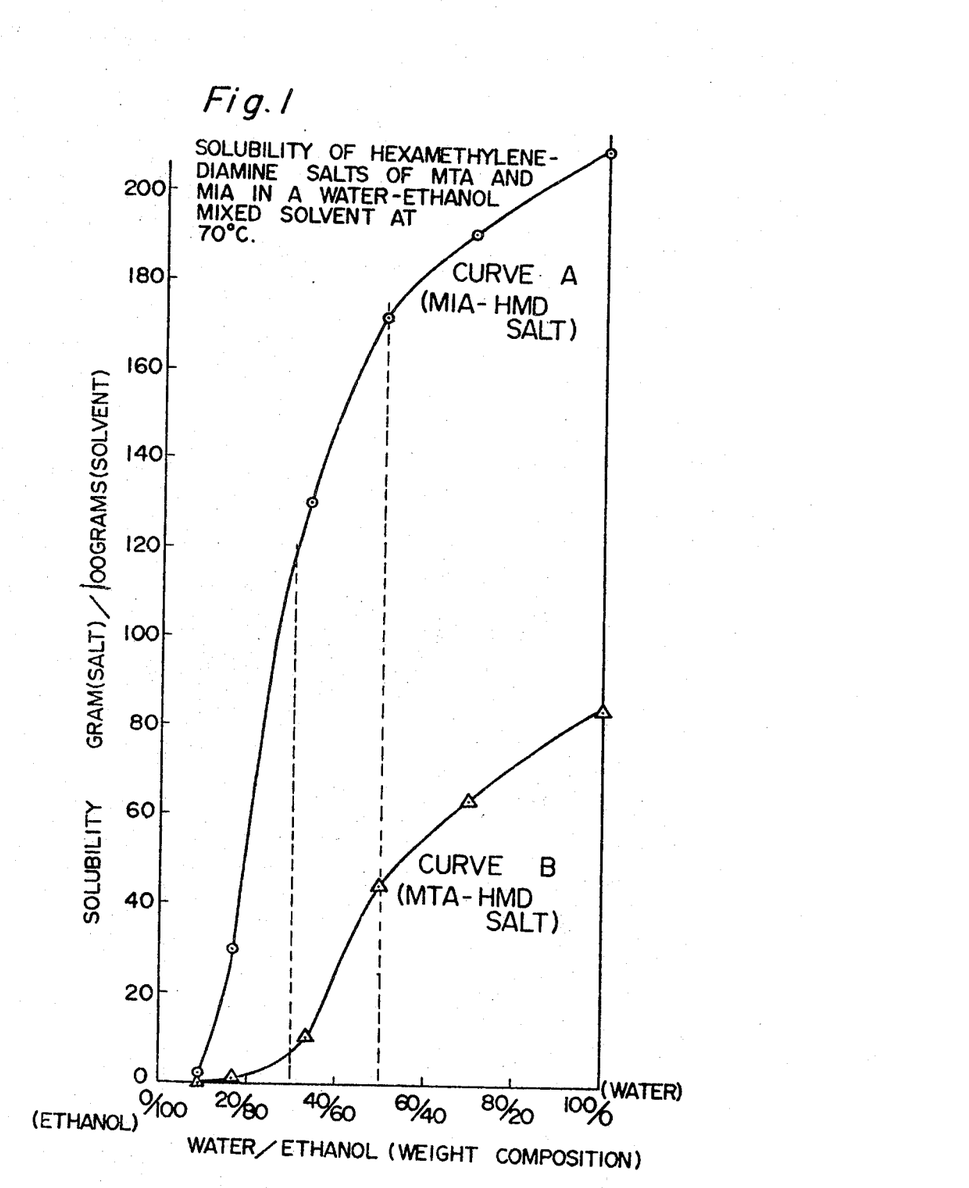
FIG. 1 showing the curves of solubilities of the salts in a water-ethanol mixed solvent, and FIG. 2 showing the curves of the solubilities of the salts in a water-methyl cellosolve mixed solvent.
Figure 2:
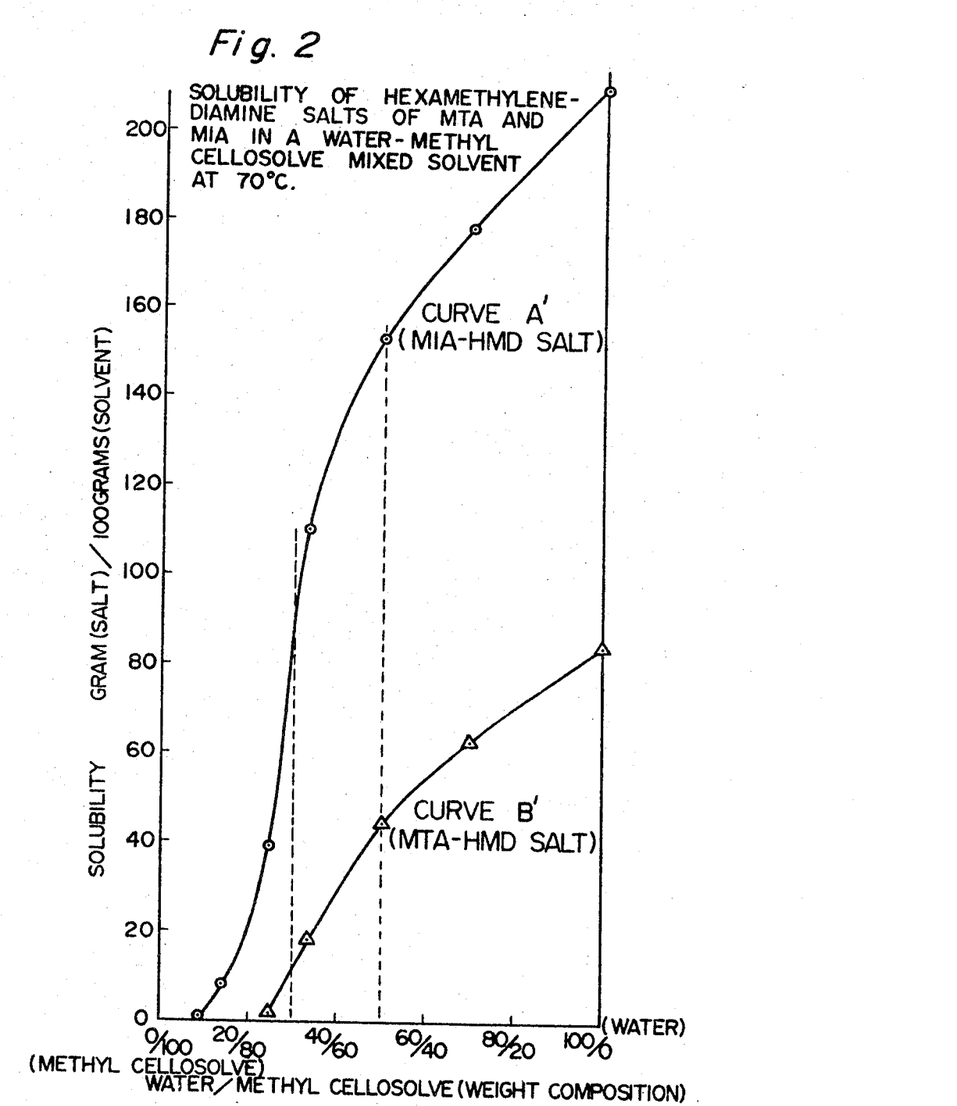

By way of experiment, the respective hexamethylenediamine salts of MTA and MIA whose purity was confirmed by means of gas chromatography, were tested for their solubilities;

In FIG. 1 curve A shows the solubility in a water-ethanol mixed solvent of a salt of 1 mol of MIA and 1 mol of hexamethylenediamine (HMD) (hereinafter to be referred to as MIA-HMD salt), while curve B similarly shows the solubility in a water-ethanol mixed solvent of a salt of 1 mol of MTA and 1 mol of hexamethylenediamine (HMD) (hereinafter to be referred to as MTA-HMD salt). The curves of FIG. 1 were plotted on the basis of solubilities measured at 70°C., the weight compositions of water-ethanol being shown along the horizontal axis and the solubilities of the foregoing respective salts (number of grams of salt/100 grams of solvent) being shown along the vertical axis.

When the ratio of the solubilities in water:

solubility of MIA-HMD salt (A)/solubility of MTA-HMD salt (B)

is calculated on the basis of the curves A and B of FIG. 1, $$A \text{ (water)}/B \text{ (water)} \approx 2.5.$$

In this connection, in the case where the weight compositions of water/ethanol are 50/50 and 30/70, the foregoing A/B become as follows:

$$A (50/50)/B (50/50) \approx 3.8$$

$$A (30/70)/B (30/70) \approx 16.9.$$

Therefore, it can be understood from the foregoing change in the ratio A/B that by the use of a mixed solvent of water and a hydrophilic organic solvent in accordance with the invention the ratio of A/B becomes much greater than the case where water alone is used as the medium, with the consequence that a much greater enhancement of the separation effect, i.e., the selectivity, is had.

FIG. 2 shows, as in FIG. 1, the curves of the respective solubilities of the MIA-HMD salt and the MTA-HMD salt in a water-methyl cellosolve mixed solvent, the solubility of the MIA-HMD salt being shown by curve A' and that of MTA-HMD by curve B'.

In FIG. 2 also, the ratio $$A' \text{(water)}/B' \text{(water)} \approx 2.5$$

whereas the ratios $$A' (50/50)/B' (50/50) \approx 3.5$$
$$A' (30/70)/B' (30/70) \approx 7.9.$$

Thus, it can be appreciated that the ratio A/B becomes much greater when the water-methyl cellosolve mixed solvent is used than when water alone is used.

Further, in FIGS. 1 and 2 it is observed that the respective solubilities of the MTA-HMD salt in the water-ethanol and water-methyl cellosolve mixtures decrease concomitantly with an increase in the concentration of either the ethanol or methyl cellosolve, with the consequence it can be seen that the operation of separating the MTA-HMD salt becomes easier and that its recovery becomes greater.

To aid in understanding the invention, the respective curves of the solubilities of the MIA-HMD salt and the MTA-HMD salt in the water-ethanol and water-methyl cellosolve mixtures have been shown in FIGS. 1 and 2, but the salts of MIA and MTA and the bases indicated in (a) - (e), above, as used in the invention, show uniform solubility curves having the same tendency as in FIGS. 1 and 2 when dissolved in the aforesaid specified mixed solvents of the present invention.

The solubilities in a water-ethanol mixed solvent of the salts of MIA and MTA and the various bases, as used in the invention, are shown in Table 1. By way of comparison, the solubilities in water and the A/B values, as hereinbefore described, are also shown in Table 1, below.

The solubilities of the several salts of the hereinbefore described bases and MIA and MTA, as used in the invention, in the various classes of mixed solvents used in the invention, which are comparable to those shown in FIGS. 1 and 2 and Table 1, can be readily determined experimentally prior to practicing the invention.

Therefore, the matter of the composition of the mixed solvent of water and the hydrophilic organic solvent and the proper amount in which it is to be used can be readily determined in accordance with the class of the several salts of MIA and MTA.

As previously indicated, the base used in the invention may be any so long as it is at least one selected from the group consisting of a. ammonia,
b. aliphatic diamines of 2 – 12 carbon atoms,
c. diamines of the formula $$H_2N-(CH_2)-{_n}\phi-(CH_2)-{_n}NH_2$$

wherein $n$ is a positive integer from 1 to 3, and $\phi$ is either p- or m-phenylene or p- or m-cyclohexylene,
d. bis-(p-aminocyclohexyl)methane (PACM), and
e. piperazine.

Of the aforesaid bases, (a), (d) and (e) are self-evident and no further explanation is believed necessary.

As the diamines of (b), included are ethylenediamine, tetramethylenediamine, hexamethylenediamine, octamethylenediamine, decamethylenediamine, dodecamethylenediamine, 3-methylhexamethylenediamine and 2,2,4- and 2,4,4-trimethylhexamethylenediamine. While any of the foregoing diamines are useful for the purpose of this invention, particularly preferred are hexamethylenediamine and dodecamethylenediamine.

As the diamines of (c), preferred are such, for example, as p- and m-xylylenediamine, p- and m-di-(beta-aminoethyl)benzene,

TABLE 1

| Class of amine | Hexa-methylene diamine | Dodeca-methylene diamine | p-xylylene-diamine | Pipera-zine | Ammonia |
|---|---|---|---|---|---|
| Temperature (°C.) | 70 | 70 | 70 | 70 | 70 |
| Mixed Solvent | | | | | |
| Hydrophilic organic solvent | ethanol | ethanol | ethanol | ethanol | ethanol |
| Water (wt. %) | 30 | 30 | 30 | 30 | 50 |
| Solubility in Solvent | | | | | |
| MTA Salt (g/100 g solv.) | 7.0 | 2.0 | 0.5 | 0.6 | 36 |
| MIA Salt (g/100 g solv.) | 118 | 82 | 7.2 | 8.6 | 140 |
| Solubility of MIA salt | | | | | |
| Solubility of MTA salt (A/B) | 16.9 | 41.0 | 14.4 | 14.3 | 3.9 |
| Solubility in Water | | | | | |
| MTA Salt (g/100 g water) | 84 | 28 | 10 | 7 | 66 |
| MIA Salt (g/100 g water) | 210 | 280 | 69 | 58 | 213 |
| Solubility of MIA salt | | | | | |
| Solubility of MTA salt (A/B) | 2.5 | 10.0 | 6.9 | 8.3 | 3.2 | p- and m-di-(aminomethyl)cyclohexane and p- and m-di-(beta-aminoethyl)cyclohexane.

Of the specified bases, ammonia (a) should be used in an amount of at least 2 molar times that of the MTA-MIA mixture to form the salts of MTA-MIA bonded with 2 molar times thereof of ammonia.

On the other hand, when a base or bases of (b) through (e) are used, salts of MTA-MIA mixture bonded with equimolar amounts of the base may be formed.

For the formation of such salts, the generally preferred practice is to use a slightly excessive amount of the base than the stoichiometric amount of the base to be bonded with the mixture, i.e., if the base is ammonia, an amount slightly more than 2 molar times the mixture, e.g., 2.05 – 2.2 molar times, may be used. If the base is any from the groups (b) through (e), slightly more than the equimolar amount of such a base. e.g., 1.03 – 1.1 mols per mol of the mixture may be allowed to react with the mixture.

According to the invention, a mixture of the salts of the aforesaid MTA and MIA and at least one of the bases of (a) – (e), above, is contacted with the aforesaid mixed solvent of water and a hydrophilic organic solvent. This contact between the mixture of the salts and the mixed solvent may be carried out in any one of the following ways. The respective salts of MTA and MIA may be first formed and then the contact of the salts may be had with the mixed solvent, or the contact of the salts with the mixed solvent may be carried out while forming the salts in the mixed solvent. Alternatively, the hydrophilic organic solvent can be added to an aqueous solution of the mixture of salts.

Accordingly, the specific methods for carrying out the aforesaid contact include such, for example, as:

1. A method of contacting the mixture of the salts of MTA and MIA with a mixed solvent which comprises either dissolving or suspending a mixture of MTA and MIA in a mixed solvent containing the aforesaid bases in such a proportion that the basic groups are present in at least an equimolar quantity relative to the total carboxyl groups contained in the aforesaid mixture.

2. A method which comprises suspending MTA and MIA in the aforesaid mixed solvent, adding the aforesaid bases containing basic groups in at least an equimolar quantity relative to the total carboxyl groups of the MTA and MIA to thereby convert the acids to the salts with the aforesaid bases and at the same time effect the contact of the salts with the mixed solvent.

3. A method which comprises either dissolving or suspending a mixture of the salts of MTA and MIA and the aforesaid bases, in the aforesaid mixed solvent to thereby effect the contact of the mixture of salts with the aforesaid solvent.

4. A method which comprises adding the aforesaid hydrophilic organic solvent to either an aqueous solution or water suspension of a mixture of the salts of MTA and MIA with the aforesaid bases to thereby effect the contact of the mixture of the aforesaid salts with the mixed solvent of water and the aforesaid hydrophilic organic solvent.

Any of these methods (1) – (4) can be employed in the present invention. The contact of the mixture of the salts of the aforesaid acids and the mixed solvent is preferably carried out either at room temperature or a temperature in the range from room temperature to just below the boiling point of the mixed solvent. The foregoing contact can, of course, be carried out at temperatures which are either lower or higher than the foregoing range. For instance, the contact can be carried out under superatmospheric pressures at temperatures lower than the decomposition of the respective salts of MIA or MTA.

The method of contact of (1), above, will be described hereinbelow.

A mixture of MTA and MIA is added with stirring to the aforesaid mixed solvent (a hydrophilic organic solvent and water) containing a base of (b) – (e), above, in at least an equimolar quantity or at least a 2 molar quantity of ammonia relative to the MTA and MIA that are added. As hereinbefore noted, the mixed solvent can be heated at a suitable temperature at this time. It is, of course, possible to heat the solvent after addition of MTA and MIA. Then, when the amount of the aforesaid mixed solvent is adequate in relation to its temperature, substantially all of the added MIA and MTA dissolves in the mixed solvent in the form of salts thereof with the base which has been added to the mixed solvent in advance. However, when the amount of the mixed solvent is inadequate, the salt of MIA, whose solubility in the mixed solvent is greater, dissolves substantially completely, but a part or practically all of the salt of MTA remains insoluble and in suspension in the mixed solvent in a solid form. This will be readily understandable from the solubility curves shown in FIGS. 1 and 2, which show that the solubility of the MTA salt is far smaller than that of the MIA salt.

Now, when the mixed solvent solution of the so obtained salts of MTA and MIA is cooled and/or concentrated, the salt of MTA whose solubility is less, precipitates out, and it therefore becomes possible to bring about a state wherein substantially all of the salt of MIA, whose solubility is great, remains in solution in the mixed solvent. When the so precipitated MTA salt is separated from the mixed solvent phase by means of such known techniques as filtration, centrifugal separation or centrifugal settling, a mixture of the respective salts of MTA and MIA containing the MTA salt at a far higher concentration than the MTA concentration in the mixture of MTA and MIA that was first added is obtained. Further, if the hereinbefore described cooling and/or concentration operation is carried out under suitable conditions, an MTA salt containing practically no MIA salt can be separated and recovered.

Again, in forming the suspension in the hereinbefore described method of contact 1) by adding the respective salts of MTA and MIA to the aforesaid mixed solvent, it is preferred to control the various conditions to ensure that substantially all of the MIA salt dissolves while only a part of the MTA salt becomes suspended in it solid state. After separating the solid MTA salt from the resulting suspension by a solid-liquid separation technique such as hereinbefore described, the resulting filtrate may be cooled and/or concentrated to cause further precipitation, as hereinbefore described, of an MTA salt which, if possible, does not entrain the MIA salt, followed by the isolation of the MTA salt. Alternately, the foregoing suspension may be cooled and/or concentrated immediately following its formation to cause the precipitation of the MTA salt without entrainment, if possible, of the MIA salt, after which the MTA salt is separated and recovered.

Figure 3:
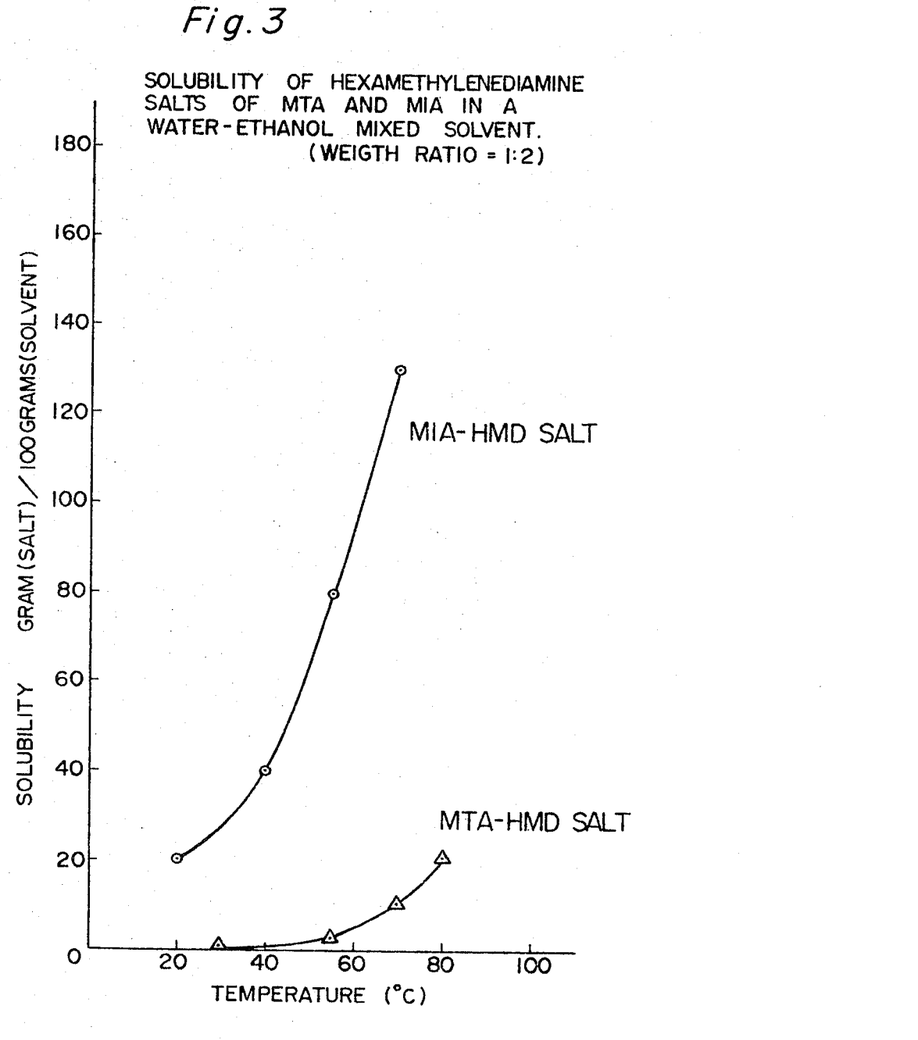

The accompanying FIG. 3 is a graph which shows the dependence on the temperature of the solubility (number of gram of salt per 100 grams of solvent) of the foregoing MIS-HMD salt and MTA-HMD salt in a water-ethanol mixture (weight ratio = 1:2). It is apparent from FIG. 3 that the solubility of the MTA-HMD salt is much less than that of the MIA-HMD salt, and also that the solubility of the MTA-HMD salt demonstrates an abrupt decline with a fall of the temperature. Therefore, it can be seen that by cooling the aforesaid heated mixed solvent in which the respective salts of MTA are dissolved and MIA to a suitable temperature it becomes possible to substantially precipitate the MTA salt only without precipitating any appreciate MIA salt, following which the MTA salt can be separated and recovered.

The method in which the MTA salt is precipitated by concentration is especially suitable in the case where the hydrophilic organic solvent, the constituent of the mixed solvent, is one having a boiling point higher than 100°C. such, for example, as methyl cellosolve, ethyl cellosolve and ethylene glycol.

While the methof of separating and recovering the MTA salts in accordance with the method of contact (1) has been described hereinbefore, it is also possible in the case of the hereinbefore described methods of contact (2) – (4) to separate and recover the MTA salt in a substantially pure state by operating in like manner as in the aforesaid method (1) or at least obtain the MTA salt at a far higher concentration than that of the MTA-MIA mixture used as the starting material.

When the starting MTA-MIA mixture contains water-insoluble impurities, these impurities are preferably removed before the salts resulting from the acid mixture and the base are dissolved in the mixed solvent by subjecting the solution to a suitable solid-liquid separation means such as filtration. For example, when a MTA-MIA mixture obtained through oxidation in the presence of a heavy metal compound, such as of cobalt or manganese, as catalyst is reacted with a base to form the corresponding salts, it occasionally happens that the catalyst heavy metal compound remains in the system as insoluble impurities. Such impurities should preferably be removed from the solution of the salts.

It is again an advantageous practice to decolorize the solution, if necessary, using active carbon, etc., if the solution is colored.

When diamines such as hexamethylenediamine, dodecamethylenediamine, PACM and p-xylylenediamine are used as the base, the MTA salts form the so-called "nylon salts" with these bases themselves. Accordingly, such MTA salts can be polycondensed and separated and recovered from the mixed solvent solution or, after further purification, be converted to polyamides.

Thus the conversion of the MTA-MIA mixture to the salts with a specific base selected from the groups (a) through (e) in accordance with the present invention has two important significances: one of which is that, upon conversion to such salts, a substantial difference takes place between the solubilities of the MTA salt and the MIA salt in the mixed solvent, so that the two salts may be separated utilizing this difference in solubilities; and the other is that, because some of the specified bases directly form nylon slats with MTA, the separated MTA salt can be used directly as the starting material for preparing polyamides, etc., without the intervening conversion to MTA.

According to the invention, the separated MTA salt may be again contacted with the mixed solvent and, if desired, cooled and/or concentrated. Obviously, the MTA salt content of the separated product is increased still more through such a practice.

According to the invention, the thus separated and recovered MTA salt or the MTA salt-MIA salt mixture containing the MTA salt at an increased concentration may be precipitated with the addition of an acid, if desired, to convert it to MTA or an MTA-MIA mixture of increased MTA content.

This precipitation with the addition of an acid can be achieved by contacting the MTA salt or the salt mixture of high MTA salt content with an acid or aqueous acid of an acidity stronger than that of MTA, such as the mineral acids, e.g., hydrochloric, sulfuric and nitric acids, and separating the thus precipitated MTA or MTA-containing mixture by such known solid-liquid separation techniques as filtration, etc.

Again, according to the invention, the mother liquor remaining after the separation of the MTA salt or the MTA salt mixture from the mixed solvent solution contains the MIA salt at a higher concentration. Therefore, by cooling and/or concentrating the mother liquor, or by adding a hydrophilic organic solvent to the mother liquor, the MIA salt-MTA salt mixture containing the MIA salt at a concentration higher than that of the starting mixture can be precipitated. The resulting precipitate can be separated and recovered by such known solid-liquid separation techniques as filtration. The foregoing precipitation may be performed in a plurality of stages, if desired.

Further, the MIA salt-containing mixture recovered from the mother liquor as described hereinabove can, in accordance with the invention, be contacted once more with the mixed solvent and, if desired, cooled and/or concentrated to cause the precipitation of the MTA salt. The mother liquor remaining after the separation of the MTA salt can be subjected to the procedures described hereinabove to provide a MIA salt-MTA salt mixture of still higher MIA content.

The recovery of a salt mixture containing the MIA salt at a higher concentration from the mother liquor may be effected, if desired, by evaporation of the liquor to dryness.

The thus obtained MIA salt which contains a minor amount of the MTA salt can be used, as obtained, for the preparation of a polyamide in a manner similar to the previously described usage of the MTA salt.

It is likewise possible to add a mineral acid such as hydrochloric or sulfuric acid or an aqueous solution thereof, as already mentioned, to the mother liquor containing the MIA salt at a higher concentration to cause the precipitation of a MIA-MTA mixture of a higher MIA content from the mother liquor.

Similarly, the MIA salt-MTA salt mixture containing the MIA salt at a higher concentration, as recovered from the mother liquor, can be subjected to the action of a similar acid to be converted to an MIA-MTA mixture containing MIA at a higher concentration.

Thus, it is possible according to the invention to recover a substantially pure MTA salt or pure MTA from the starting MTA-MIA mixtures by applying these separation processes to the mixture once or a number of times. Since in accordance with the invention the MIA salt always has a greater solubility in the mixed solvent than that of the MTA salt, the MIA salt or MIA is always obtained from a state in which it is solution in the mixed solvent. On the other hand, since the MTA salt also is dissolved in the solution, although to a minor extent, the MIA salt or MIA separated and recovered from the solution always contains a minor amount of the MTA salt or MTA.

This MIA containing a minor amount of MTA, as recovered, can be purified to a purity of almost 100 % by recrystallization from a suitable solvent such as alcohols, e.g., methanol, ethanol, propanol; ethers such as diethyl ether, dioxane, tetrahydrofuran, methyl cellosolve, etc.; and carboxylic acids such as acetic acid, propionic acid, etc.

According to the invention, the MTA-MIA mixtures which are practically inseparable by conventional means can be very easily separated as a MTA salt and MIA salt through the hereinbefore described method. Some of such MTA salts or MIA salts can be polycondensed as they are to be formed into polyamides. Again, if desired, the salts can be converted to MTA or MIA.

The following examples are given for further illustration of the invention, it being understood that the examples are not to be construed as limiting the invention. In the example, the parts and percents are on a weight basis unless otherwise specified.

EXAMPLE 1

Pseudocumene was air-oxidized in an acetic acid solvent in the presence of a cobalt catalyst, and an oxidation product consisting predominantly of MIA and MTA was obtained.

That is, the ratio of MTA to MIA in the aforesaid reaction product was 59.7:40.3, and as impurities 0.9 % of dimethyl benzoic acid, 0.2 % of trimellitic acid and 0.5 % of other impurities were present. Ten parts of this oxidation product were suspended in a mixed solvent consisting of 20 parts of water and 40 parts of ethanol, and while maintaining a temperature of 60°C. and rendering the suspension weakly basis by adding 6.5 parts of hexamethylenediamine, the oxidation product was dissolved. This was followed by cooling the solution to 15°C., maintaining this temperature for one hour, and separating the precipitated salt by filtration. The dry weight of the so obtained precipitated salt was 10.2 parts.

To the so obtained precipitated salt and the mother liquor remaining after filtration of the precipitated salt water was added to make each 100 parts followed by adding hydrochloric acid to adjust their pH to below 1. 5.8 Parts of an acid-precipitated product were obtained from the precipitated salt side, while 4.1 parts of an acid-precipitated product were obtained from the mother liquor side.

When both of these products were methyl-esterified with diazomethane and analyzed by means of gas chromatography, the ratio of MTA to MIA in the precipitated salt was 94.0:6.0, while the ratio of MTA to MIA in the mother liquor was 11.3:88.7.

EXAMPLES 2 – 15

Example 1 was repeated using HMD as the base and varying the class of the hydrophilic organic solvent and the ratio of the mixture thereof with water to carry out the separation and recovery of mixtures of MTA and MIA, with the results shown in Table 2.

The abbreviations used in Table 1 (also applicable to the subsequent tables) have the following meanings:

| HMD | hexamethylenediamine |
| EtOH | ethanol |
| MeOH | methanol |
| iso-PrOH | isopropanol |
| n-PrOH | n-propanol |
| BG | ethylene glycol |
| MeCel | methyl collosolve |
| EtCel | ethyl cellosolve |
| DOX | dioxane |

EXAMPLE 16 – 22

Using ammonia (NH$_3$) as the base, the separation and recovery of mixtures of MTA and MIA was carried out by operating as in Example 1, while varying the class of the hydrophilic organic solvent and the ratio of the mixture thereof with water. The results obtained are shown in Table 3.

EXAMPLES 23 – 35

The separation and recovery of mixture of MTA and MIA was carried out by operating as in Example 1, using as the base ethylene diamine (ED), 3-methylhexamethylenediamine (3-MeHMD), dodecamethylenediamine (MD–12), piperazine (PPZ), a mixture of 1,4-diaminomethylcyclohexane and 1,3-diaminomethylcyclohexane (AMCH, 1,4-diaminomethylcyclohexane/1,3-diaminomethylcyclohexane; mixture ratio = 70/30), bis(p-aminocyclohexyl) methane (PACM), p-xylylenediamine (p-XD), m-xylylenediamine (m-XD) and a mixture of p-XD and m-XD (XD, p-XD/m-XD mixture ratio = 70/30), and varying the class of the hydrophilic organic solvent and the ratio of the mixture thereof with water. The results obtained are shown in Table 4.

The abbreviations used above will also be applicable in the subsequent tables.

EXAMPLE 36

Ten parts of the oxidation product used in Example 1 were suspended in 20 parts of water, following which the resulting suspension was rendered weakly basic by adding 6.5 parts of hexamethylenediamine while maintaining a temperature of 30°C. to thereby dissolve the oxidation product. Next, 70 parts of methyl cellosolve were added with stirring while maintaining the foregoing temperature to thus precipitate a salt. The dry weight of the resulting precipitated salt was 9.7 parts. Water was added to both the precipitated salt and the filtrate remaining after the precipitated salt was separated by filtration and each was made into 100 parts. The pH of each was adjusted to below 1 by adding hydrochloric acid. 5.5 Parts of an acid-precipitated product were obtained from the precipitated salt side, while 4.1 parts of an acid-precipitated product were obtained from the filtrate side. The products were each converted to methyl esters with diazomethane, followed by analysis by gas chromatography, with the result that the ratio of MTA to MIA in the precipitated salt was 95.4:4.5 and the same ratio in the filtrate was 14.9:85.1.

EXAMPLES 37 – 41

The separation and recovery of a mixture of MTA and MIA was carried out while varying the class of the base, the class of the hydrophilic organic solvent and the proportion of mixture of the solvent and water, operating as in Example 36 wherein the salts of the mixture of MTA and MIA and the base were first dissolved in water and thereafter the salts were precipitated with the addition of a hydrophilic organic solvent to the solution. The results obtained are shown in Table 5.

TABLE 2

| Example No. | Starting mixture Composition MTA | MIA | Base Type | Amount (part) | Mixed solvent Hydrophilic organic solvent Type | Amount (part) | Water (part) | H₂O (percent) | Dissolving Temp. (°C.) | Solid-liquid separating Temp. (°C.) | Acids and composition thereof obtained from solid phase Amount (part) | Composition MTA | MIA | Acids and composition thereof obtained from liquid phase Amount (part) | Composition MTA | MIA |
|---|---|---|---|---|---|---|---|---|---|---|---|---|---|---|---|---|
| 1 | 59.7 | 40.3 | HMD | 6.5 | EtOH | 40 | 20 | 33.3 | 60 | 15 | 5.8 | 94.0 | 6.0 | 4.1 | 11.3 | 88.7 |
| 2 | 59.7 | 40.3 | HMD | 6.6 | MeOH | 20 | 10 | 33.3 | 60 | 15 | 5.4 | 92.4 | 7.6 | 4.5 | 22.2 | 79.8 |
| 3 | 59.7 | 40.3 | HMD | 6.6 | EtOH | 70 | 30 | 30.0 | 60 | 15 | 5.0 | 95.7 | 4.3 | 5.0 | 22.1 | 79.9 |
| 4 | 59.7 | 40.3 | HMD | 6.6 | iso-PrOH | 40 | 20 | 33.3 | 60 | 15 | 5.0 | 76.2 | 23.8 | 3.0 | 10.0 | 90.0 |
| 5 | 59.7 | 40.3 | HMD | 6.6 | n-PrOH | 80 | 30 | 27.3 | 60 | 15 | 6.3 | 85.1 | 14.9 | 3.6 | 15.0 | 85.0 |
| 6 | 59.7 | 40.3 | HMD | 6.6 | EG | 10 | 10 | 50 | 70 | 30 | 5.1 | 92.1 | 7.9 | 4.8 | 25.2 | 74.8 |
| 7 | 80 | 20 | HMD | 6.5 | EtOH | 12 | 12 | 50 | 60 | 30 | 7.1 | 99.1 | 0.9 | 2.9 | 33.1 | 66.9 |
| 8 | 30 | 70 | HMD | 6.5 | EtOH | 12 | 12 | 50 | 60 | 30 | 2.5 | 90.2 | 9.8 | 7.5 | 9.9 | 90.1 |
| 9 | 59.7 | 40.3 | HMD | 6.5 | MeCel | 50 | 30 | 37.5 | 60 | 15 | 5.1 | 93.6 | 6.4 | 4.1 | 11.7 | 88.3 |
| 10 | 50 | 50 | HMD | 6.5 | DOX | 60 | 30 | 33.3 | 60 | 15 | 4.6 | 95.2 | 4.8 | 5.3 | 21.9 | 78.1 |
| 11 | 94.0 | 6.0 | HMD | 3.7 | EtCel | 70 | 25 | 26.3 | 70 | 30 | 6.1 | 94.2 | 5.8 | 0.6 | 12.7 | 87.3 |
| 12 | 59.7 | 40.3 | HMD | 6.5 | EtOH | 38 | 19 | 33.3 | 60 | 15 | 5.2 | 99.9 | 0.1 | 0.6 | 59.3 | 40.7 |
| 13 | 59.7 | 40.3 | HMD | 6.6 | EtOH | 1.7 | 15 | 90 | 80 | 15 | 5.5 | 89.3 | 10.7 | 4.3 | 27.2 | 73.8 |
| 14 | 59.7 | 40.3 | HMD | 6.6 | EtOH | 10.7 | 16 | 60 | 60 | 15 | 5.5 | 91.6 | 8.4 | 4.3 | 19.8 | 80.2 |
| 15 | 59.7 | 40.3 | HMD | 6.6 | EtOH | 450 | 50 | 10 | 60 | 15 | 5.6 | 96.2 | 3.8 | 4.2 | 11.9 | 88.1 |

TABLE 3

| Example No. | Starting mixture Composition MTA | MIA | Base Type | Amount (part) | Mixed solvent Hydrophilic organic solvent Type | Amount (part) | Water (part) | H₂O (percent) | Dissolving Temp. (°C.) | Solid-liquid separating Temp. (°C.) | Acids and composition thereof obtained from solid phase Amount (part) | Composition MTA | MIA | Acids and composition thereof obtained from liquid phase Amount (part) | Composition MTA | MIA |
|---|---|---|---|---|---|---|---|---|---|---|---|---|---|---|---|---|
| 16 | 59.7 | 40.3 | NH₃ | 2.2 | MeOH | 30 | 10 | 25.0 | 60 | 10 | 4.9 | 87.4 | 12.6 | 5.0 | 34.0 | 66.0 |
| 17 | 59.7 | 40.3 | NH₃ | 2.2 | EtOH | 80 | 30 | 27.3 | 80 | 10 | 5.8 | 92.7 | 7.3 | 4.9 | 15.0 | 85.0 |
| 18 | 59.7 | 40.3 | NH₃ | 2.2 | iso-PrOH | 40 | 20 | 33.3 | 60 | 15 | 5.9 | 89.6 | 10.4 | 3.9 | 17.1 | 82.9 |
| 19 | 59.7 | 40.3 | NH₃ | 2.2 | n-PrOH | 70 | 30 | 30.0 | 60 | 30 | 6.2 | 87.3 | 12.7 | 3.6 | 15.3 | 84.7 |
| 20 | 59.7 | 40.3 | NH₃ | 2.2 | EG | 10 | 10 | 50.0 | 70 | 20 | 5.3 | 91.9 | 8.1 | 4.6 | 23.9 | 76.1 |
| 21 | 70.0 | 30.0 | NH₃ | 2.2 | EtOH | 20 | 20 | 50.0 | 60 | 10 | 6.1 | 96.8 | 3.2 | 3.7 | 29.7 | 70.3 |
| 22 | 40.0 | 60.0 | NH₃ | 2.2 | EtOH | 30 | 10 | 25.0 | 80 | 10 | 4.1 | 78.1 | 21.9 | 5.8 | 13.8 | 86.2 |

TABLE 4

| Example No. | Starting mixture Composition MTA | MIA | Base Type | Amount (part) | Mixed solvent Hydrophilic organic solvent Type | Amount (part) | Water (part) | H₂O (percent) | Dissolving Temp. (°C.) | Solid-liquid separating Temp. (°C.) | Acids and composition thereof obtained from solid phase Amount (part) | Composition MTA | MIA | Acids and composition thereof obtained from liquid phase Amount (part) | Composition MTA | MIA |
|---|---|---|---|---|---|---|---|---|---|---|---|---|---|---|---|---|
| 23 | 59.7 | 40.3 | ED | 3.6 | EtOH | 120 | 35 | 22.6 | 60 | 10 | 3.7 | 94.1 | 5.9 | 6.2 | 39.1 | 60.9 |
| 24 | 59.7 | 40.3 | ED | 3.6 | MeCel | 80 | 20 | 20.0 | 60 | 10 | 5.1 | 93.2 | 6.8 | 4.8 | 24.2 | 75.8 |
| 25 | 59.7 | 40.3 | 3-MeHMD | 7.8 | EtOH | 30 | 10 | 25.0 | 70 | 15 | 4.5 | 87.2 | 12.8 | 5.3 | 39.3 | 60.7 |
| 26 | 59.7 | 40.3 | MD-12 | 12 | EtOH-iso-PrOH | 50/50 | 10 | 16.7 | 70 | 30 | 6.1 | 81.5 | 18.5 | 3.8 | 24.7 | 75.3 |
| 27 | 59.7 | 40.3 | MD-12 | 12 | MeCel | 70 | 40 | 36.4 | 70 | 20 | 6.0 | 82.4 | 17.6 | 3.9 | 24.3 | 75.7 |
| 28 | 59.7 | 40.3 | MeCel | 11 | EtOH | 20 | 8 | 28.5 | 80 | 15 | 4.5 | 89.3 | 10.7 | 5.3 | 35.9 | 64.1 |
| 29 | 59.7 | 40.3 | PPZ | 8.5 | EtOH | 30 | 10 | 25.0 | 70 | 20 | 5.9 | 87.8 | 12.2 | 4.4 | 19.6 | 80.4 |
| 30 | 59.7 | 40.3 | AMCH | 14 | EtOH | 40 | 20 | 33.3 | 80 | 15 | 6.5 | 96.3 | 3.7 | 4.0 | 15.9 | 84.1 |
| 31 | 70.0 | 30.0 | PACM | 8 | EtOH | 80 | 40 | 33.3 | 60 | 15 | 5.4 | 98.2 | 1.8 | 4.3 | 18.2 | 81.8 |
| 32 | 70.0 | 30.0 | p-XD | 8 | EtOH | 50 | 50 | 50.0 | 70 | 15 | 2.4 | 92.4 | 7.6 | 7.4 | 51.1 | 48.9 |
| 33 | 60.0 | 40.0 | m-XD | 8 | MeCel | 20 | 10 | 33.3 | 90 | 10 | 4.0 | 87.1 | 12.9 | 5.9 | 42.8 | 57.2 |
| 34 | 59.7 | 40.3 | XD | 8 | EtOH | 40 | 14 | 25.9 | 70 | 15 | 5.9 | 95.2 | 4.8 | 3.9 | 9.0 | 91.0 |
| 35 | 59.7 | 40.3 | p-XD | 10 | EtOH | 100 | 50 | 33.3 | 70 | 15 | 5.2 | 95.8 | 4.2 | 4.6 | 19.5 | 80.5 |
| | | | p-XD | 10 | EtOH | 40 | 40 | 50.0 | 70 | 20 | | | | | | |

TABLE 5

| Example No. | Starting mixture Composition MTA | MIA | Base Type | Amount (part) | Mixed solvent Hydrophilic organic solvent Type | Amount (part) | Water (part) | H₂O (percent) | Dissolving Temp. (°C) | Solid-liquid separating Temp. (°C) | Acids and composition thereof obtained from solid phase Amount (part) | Composition MTA | MIA | Acids and composition thereof obtained from liquid phase Amount (part) | Composition MTA | MIA |
|---|---|---|---|---|---|---|---|---|---|---|---|---|---|---|---|---|
| 36 | 59.7 | 40.3 | HMD | 10 | MeCel | 70 | 20 | 20.0 | 30 | 30 | 5.5 | 95.5 | 4.5 | 4.1 | 14.9 | 85.1 |
| 37 | 59.7 | 40.3 | HMD | 10 | MeCel | 70 | 40 | 36.4 | 30 | 30 | 5.2 | 96.2 | 3.8 | 4.7 | 19.3 | 80.7 |
| 38 | 59.7 | 40.3 | HMD | 10 | MeCel | 70 | 30 | 30.0 | 30 | 30 | 5.6 | 93.6 | 6.4 | 4.3 | 15.5 | 84.5 |
| 39 | 70 | 30 | ED | 10 | DOX | 70 | 20 | 22.2 | 30 | 30 | 5.0 | 96.4 | 3.6 | 4.0 | 32.8 | 67.2 |
| 40 | 40 | 60 | MD-12 | 10 | EtCel | 70 | 40 | 36.4 | 30 | 30 | 3.1 | 90.4 | 9.6 | 6.8 | 17.6 | 82.4 |
| 41 | 59.7 | 40.3 | HMD | 10 | EtOH | 60 | 20 | 25.0 | 30 | 30 | 5.1 | 94.3 | 5.7 | 4.7 | 24.0 | 76.0 |

EXAMPLE 42

Ten parts of hexamethylene (HMD) salts of a mixture of MTA and MIA (MTA/MIA = 60/40) were suspended in a mixed solvent of 28 parts of ethanol and 14 parts of water and stirred for 8 hours at 30°C., after which a solid product was separated by filtration at the foregoing temperature, precipitated with the addition of an acid as in Example 1 and analyzed. As a result, the weight of that obtained from the solids portion after precipitation and drying was 3.5 parts, and the weight of that obtained from the liquid phase portion was 2.1 parts. The ratio of MTA to MIA of the former was 84.2:15.8, while the same ratio in the case of the latter was 21.0:79.0.

EXAMPLE 43

Ten parts of a mixture of MTA and MIA whose ratio of mixture of MTA to MIA were 60:40 was suspended in a mixed solution consisting of 10 parts of water and 20 parts of methanol, after which hexamethylenediamine was added at 60°C. to render the suspension weakly basic to thereby dissolve the aforesaid acid mixture. The resulting solution was then cooled to 20°C. to precipitate a solid (designated precipitate 1), which was separated by filtration. Next, 30 parts of isopropanol were added to the filtrate side, and the resulting precipitated solid (designated precipitate 2) was separated by filtration to isolate precipitate 2 from the mother liquor. Precipitates 1 and 2 and the mother liquor were each precipitated by adding an acid and the respective compositions were determined. The results obtained are shown in the following table.

|   | Weight of acid-precipitated product (part) | MTA/MIA |
|---|---|---|
| Precipitate 1 | 5.0 | 95.7/4.3 |
| Precipitate 2 | 3.7 | 31.3/68.7 |
| Mother liquor | 1.1 | 5.6/94.4 |

EXAMPLE 44

Ten parts of the same oxidation product as in Example 1 were suspended in a mixed solvent consisting of 10 parts of water and 20 parts of methyl cellosolve. This was followed by the addition of 6.6 parts of hexamethylenediamine and heating 80°C. to effect the dissolution of the oxidation product. The so obtained solution was then cooled to 30°C. and the resulting precipitate (designated precipitate 1) was separated by filtration. After removing 9.9 parts of water and 10.1 parts of methyl cellosolve by distillation of the filtrate, the still residue was cooled to 15°C. to obtain a precipitate (designated precipitate 2) which was separated from the mother liquor by filtration. After each of these components were precipitated with the addition of an acid, they were analyzed with the results shown in the following table.

|   | Weight of acid-precipitated product (part) | MTA/MIA |
|---|---|---|
| Precipitate 1 | 5.4 | 93.6/6.4 |
| Precipitate 2 | 4.4 | 18.4/81.6 |
| Mother liquor | negligible | — |

EXAMPLE 45

One part of an acid mixture obtained by precipitation of the filtrate obtained in Example 1 with an acid and whose MTA/MIA is 11.3/88.7 was dissolved at 60°C. along with 40 parts of methanol, following which the solution was cooled to 10°C. to obtain a precipitate, which was separated by filtration. When the precipitate and the filtrate were dried and their weights were determined, that of the precipitate was 0.6 part and that of the filtrate was 0.4 parts. Further, when they were methyl-esterified and the ratio of MTA to MIA was determined by gas chromatography, the MTA/MIA of the precipitate was 1.2/98.8 and that of the filtrate was 26.3/73.7.

EXAMPLE 46

Ten parts of hexamethylenediamine salts of a mixture of MTA and MIA having a mix ratio of MTA to MIA of 60/40 were added to a mixed solvent consisting of 10 parts of water and 30 parts of ethanol, following which the mixture was heated with stirring for 3 hours at 60°C. in a state of suspension. This was followed by cooling the mixture to 30°C. and separation of a solid product by filtration. This solid product and the mother liquor after filtration were precipitated with the addition of an acid as in Example 1. As a result, the precipitate obtained from the solid product, after drying, amounted to 3.2 parts and that from the mother liquor amounted to 2.4 parts. On the other hand, the ratio of MTA to MIA in the case of the former was 91.2/8.8, while that of the latter was 19.1/80.9.

We claim:

1. A process for separating and recovering methylterephthalic acid from a mixture of methylterephthalic acid and 4-methylisophthalic acid in the form of a salt and at a higher concentration, said process comprising bringing a mixture of the salts of methylterephthalic acid and 4-methylisophthalic acid with at least one base selected from the group consisting of
   a. ammonia,
   b. aliphatic diamines of 2 - 12 carbon atoms,
   c. diamines of the formula $$H_2N-(CH_2)-_n\phi-(CH_2)-_nNH_2$$

wherein $n$ is a positive integer from 1 to 3, $\phi$ is a member selected from the group consisting of p- and m-phenylene and P- and m-cyclohexylene,
   d. bis-(p-aminocyclohexyl) methane, and
   e. piperazine,
into contact with a mixed solvent of at least 10 percent by weight of water and at least one hydrophilic organic solvent selected from the group consisting of
   1. mono- and dihydric alcohols of 1 - 3 carbon atoms,
   2. monomethyl and monoethyl ethers of ethylene glycol, and
   3. dioxane,
to separate from the mixed solvent in a solid state a salt of methylterephthalic acid and said base or a mixture of salts of methylterephthalic acid and 4-methylisophthalic acid, said mixture containing said salt of methylterephthalic acid and said base at a higher concentration, and thereafter recovering said solid product.

2. The process of claim 1 which comprises dissolving or suspending a mixture of methylterephthalic acid and 4-methylisophthalic acid in said mixed solvent containing said base in such a proportion that the basic groups contained therein are at least equivalent to the total carboxyl groups contained in said acid mixture to thereby effect the contact of said mixture of salts with said mixed solvent.

3. The process of claim 1 which comprises suspending methylterephthalic acid and 4-methylisophthalic acid in said mixed solvent and adding to the resulting suspension said base containing basic groups in an amount at least equivalent to the total amount of carboxylic groups of said methylterephthalic acid and 4-methyl isophthalic acid to thereby convert said acids to the salts thereof with said bases as well as effect the contact of said salts with said mixed solvent.

4. The process of claim 1 wherein the mixture of salts of methylterephthalic acid and 4-methylisophthalic acid and said base is dissolved or suspended is said mixed solvent to thereby effect the contact of said mixture of salts with mixed solvent.

5. The process of claim 1 which comprises adding said hydrophilic organic solvent to an aqueous solution or water suspension of the mixture of salts of methylterephthalic acid and 4-methylisophthalic acid and said base to thereby effect the contact of said mixture of salts with said mixed solvent consisting of water and hydrophilic organic solvent.

6. The process of claim 1 which comprises bringing the mixture of salts of methylterephthalic acid and 4-methylisophthalic acid and said base into contact with said mixed solvent, cooling the resulting solution or suspension to separate said salt of methylterephthalic acid or said mixture of salts containing said salt of methylterephthalic acid at a higher concentration from the mixed solvent phase, in a solid state, and thereafter recovering the separated solid product.

7. The process of claim 1, further comprising adding to the mixed solvent phase remaining after separation and recovery of the salt of methylterephthalic acid or the mixture of the salts of methylterephthalic acid and 4-methylisophthalic acid containing said salt of methylterephthalic acid at a higher concentration, at least one of said hydrophilic organic solvents to precipitate the salt of 4-methylisophthalic acid or the mixture of the salts of 4-methylisophthalic acid and methylterephthalic acid containing said salt of 4-methylisophthalic acid at a higher concentration, and thereafter recovering the precipitate.

8. The process of claim 1 wherein said methylterephthalic acid and 4-methylisophthalic acid are a mixture thereof containing at least 10 % by weight, of the former.

9. The process of claim 1 wherein the salts of the mixture of methylterephthalic acid and 4-methylisophthalic acid and said ammonia of (a), are salts composed of 2 mols of ammonia for each mol of said acid mixture.

10. The process of claim 1 wherein the salts of the mixture of methylterephthalic acid and 4-methylisophthalic acid and at least one base selected from the group consisting of said (b), (c), (d) and (e) are salts composed of one mol of said base for each mol of said acid mixture.

11. The process of claim 1 wherein said mixed solvent contains 15 - 90 % by weight of water.

12. The process of claim 1 wherein the contact between the salts of said acids and said mixed solvent is carried out a temperature ranging from room temperature up to just below the boiling point of said mixed solvent.

13. The process of claim 1 which comprises bringing the mixture of salts of methylterephthalic acid and 4-methylisophthalic acid and said base into contact with said mixed solvent, concentrating the resulting solution or suspension to separate said salt of methylterephthalic acid or said mixture of salts containing said salt of methylterephthalic acid at a higher concentration from the mixed solvent phase, in a solid state, and thereafter recovering the separated solid product.

14. The process of claim 1, further comprising concentrating the mixed solvent phase remaining after separation and recovery of the salt of methylterephthalic acid or the mixture of the salts of methylterephthalic acid and 4-methylisophthalic acid containing said salt of methylterephthalic acid at a higher concentration to thereby precipitate the salt of 4-methylisophthalic acid or said mixture of salts of 4-methylisophthalic acid and methylterephthalic acid containing said salt of 4-methylisophthalic acid at a higher concentration, and thereafter recovering the precipitate.

15. The process of claim 8 wherein said methylterephthalic acid and 4-methylisophthalic acid are a mixture thereof containing at least 20% by weight of the former.

* * * * *